United States Patent [19]
Alexander

[11] 3,782,568
[45] Jan. 1, 1974

[54] SPARE TIRE CARRIER

[76] Inventor: George L. Alexander, Rt. No. 3, Box 16, Stephenville, Tex. 76401

[22] Filed: Sept. 14, 1972

[21] Appl. No.: 289,056

[52] U.S. Cl. ............................... 214/454, 214/451
[51] Int. Cl. ............................................. B62d 43/00
[58] Field of Search .......................... 214/454, 451

[56] References Cited
UNITED STATES PATENTS

| | | | |
|---|---|---|---|
| 3,435,971 | 4/1969 | Powell | 214/451 |
| 2,400,274 | 5/1946 | Ullman | 214/451 |
| 2,063,092 | 12/1936 | Groden | 214/451 |
| 3,369,683 | 2/1968 | Richards | 214/454 |
| 2,034,834 | 3/1936 | Robinson | 214/451 |

Primary Examiner—Gerald M. Forlenza
Assistant Examiner—John Mannix
Attorney—Munson H. Lane

[57] ABSTRACT

A pair of spaced parallel channel beams are mounted longitudinally at the underside of a truck body with their channels opposing each other. A tire rack is positioned between and supported by the channel beams and is provided at the front thereof with rollers which ride on lower flanges of the beams so that the rack may be moved between a forwardly slid elevated position and a rearwardly slid lowered position. A transverse bar is provided at the rear end of the rack and the end portions of the bar rest on the lower flanges of the beams to hold the rack in its elevated, forwardly slid position. Removable stops at the rear ends of the flanges are engageable with the end portions of the bar to prevent rearward movement of the rack.

6 Claims, 4 Drawing Figures

PATENTED JAN 1 1974

3,782,568

SPARE TIRE CARRIER

This invention relates to new and useful improvements in spare tire carriers for vehicles such as trucks and the like, and in particular the invention concerns itself with so-called underslung carriers which are mounted at the underside of the rear end portion of a truck body and include a movable rack for the spare tire. The rack is movable from a forwardly slid elevated position to a rearwardly slid lowered position in which the tire may be easily applied to or removed from the rack.

The principal object of the invention is to provide a spare tire carrier of this general type which is very simple in construction, can be easily mounted under the truck, may be quickly and conveniently manipulated in order to apply or remove the tire, and lends itself to economical manufacture.

With the foregoing more important object and features in view and such other objects and features which may become apparent as this specification proceeds, the invention will be understood from the following description taken in conjunction with the accompanying drawings, in which like characters of reference designate like parts, and in which.

Figure 1:
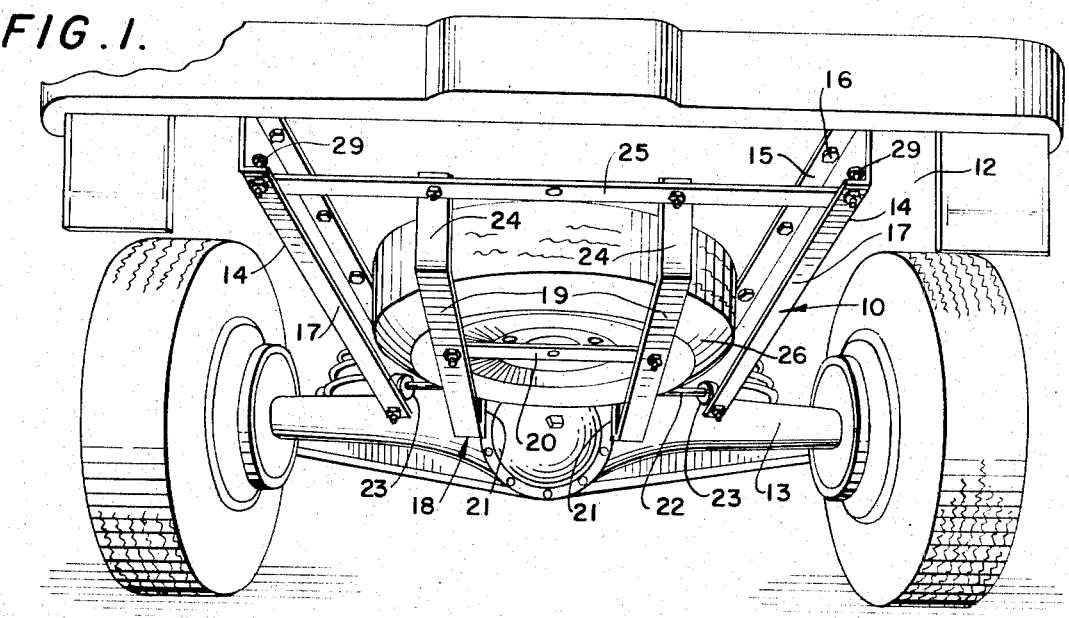
FIG. 1 is a perspective view showing the rear end portion of a truck equipped with the spare tire carrier of the invention, the carrier rack being shown in its elevated position.
Figure 2:
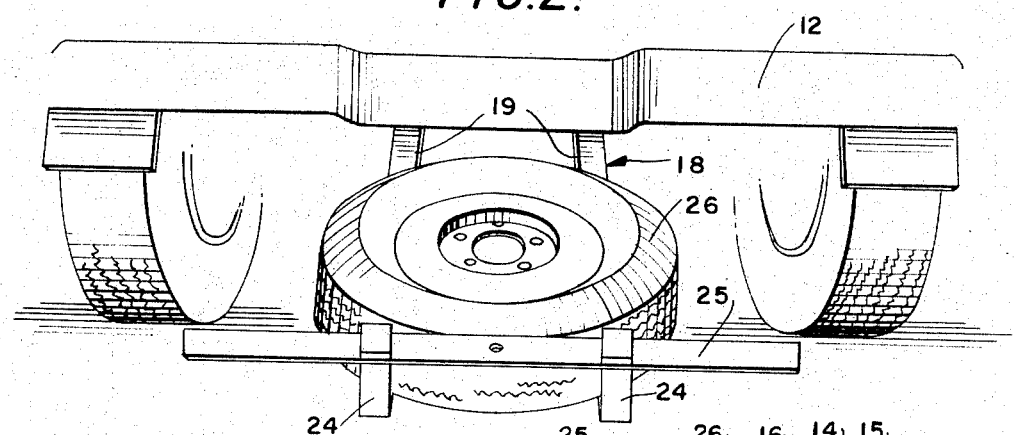
FIG. 2 is a fragmentary perspective view, similar to FIG. 1, but showing the rack in its lowered position.

Referring now to the accompanying drawings in detail, the spare tire carrier of the invention is designated generally by the reference numeral 10 and is shown as being mounted at the underside of the rear end portion of a truck body 12, rearwardly of the rear axle 13.

The carrier 10 comprises a pair of transversely spaced parallel channel beams 14, the channels of which are mutually opposed and which extend longitudinally under the truck body 12. The channel beams have upper flanges 15 which are secured to the truck body by suitable bolts 16, and also have coplanar lower flanges 17 which constitute tracks for rollers of a movable substantially rectangular tire rack designated generally as 18, now to be described.

The rack 18 comprises a pair of transversely spaced parallel longitudinal straps 19 which are connected together intermediate the ends thereof by a cross strap 20. The straps 19 have upturned front end portions 21, the upper ends of which are hooked over and rigidly secured to a transverse axle 22. The latter projects to both sides of the rack and the end portions of the axle are provided with a pair of rollers 23 which ride along the tracks constituted by the lower flanges 17 of the channel beams 14. The rear end portions 24 of the straps 19 are also upturned, and the upper ends thereof have rigidly secured thereto a transverse bar 25 which projects to both sides of the rack to substantially the same extent as the axle 22.

A spare tire 26 is receivable on the rack 18, resting on the longitudinal straps 19 and nested between the upturned front and rear end portions 21, 24 of these straps. An aperture 27 may be provided centrally in the cross strap 20 to receive a bolt (not shown) for securing the tire in position. In the storage position, the rack 18 with the tire is slid forwardly while the rollers 23 ride forwardly along the flanges 17 and the end portions of the bar 25 are resting on the rear end portions of the flanges, as shown in FIG. 1 and also by the full lines in FIG. 3. Stops in the form of upwardly projecting bolts 28 are provided at the front end of the flanges 11 to prevent the rack from moving beyond the front ends of the flanges, it being understood that in the forwardly moved position of the rack, the rollers 23 come into engagement with the stop bolts 28. Similar stop bolts 29 are removably positioned in apertures formed in the rear end portions of the flanges 17 for engagement with the end portions of the bar 25, thus preventing rearward sliding of the rack and retaining the latter in its elevated, forwardly slid position.

Figure 3:
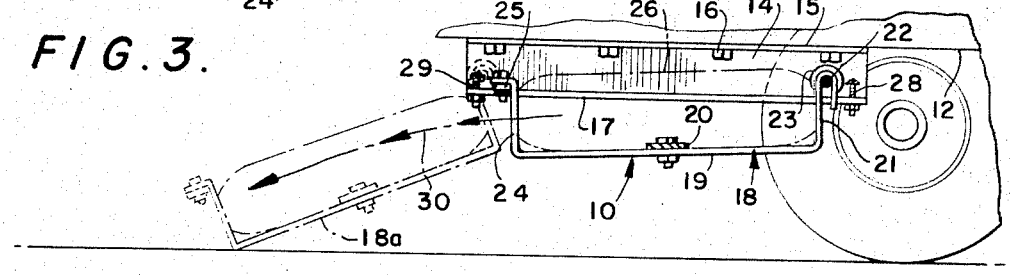
FIG. 3 is a fragmentary longitudinal sectional view of the carrier showing the rack thereof in the elevated position by full lines and in the lowered position by dotted lines.
Figure 4:
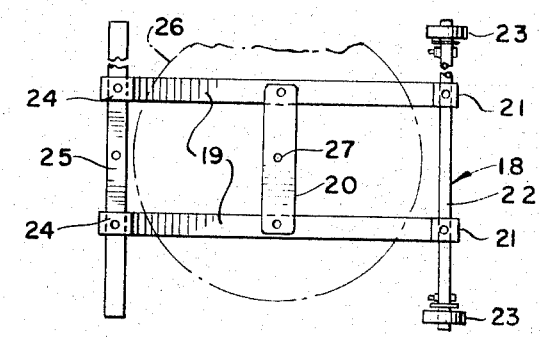
FIG. 4 is a top plan view of the rack per se.

However, when the rear stop bolts 29 are removed, the entire rack 18 with the tire thereon may be moved rearwardly as indicated by the arrow 30 in FIG. 3. During this action, the rollers 23 ride rearwardly to the rear end portions of the flanges 17, at which point the rack may be pivoted downwardly about the axis of the rollers 23 to a lowered position shown by the dotted lines 18a in FIG. 3, in which the rear end of the rack rests on the ground and the tire 26 may be quickly and easily removed from or applied to the rack.

While in the foregoing there has been shown and described the preferred embodiment of the invention, various modifications and equivalents may be resorted to within the spirit and scope of the invention as claimed.

What is claimed is:

1. A spare tire carrier for trucks and the like, comprising a pair of transversely spaced parallel channel beams adapted to be mounted longitudinally under a truck body relative to which the beams have front and rear ends, said beams having mutually channels and including coplanar lower flanges, a substantially rectangular tire rack disposed between and slidably supported by said channel beams, a pair of rollers provided at the opposite sides of the front end of said rack, said rollers riding on said lower flanges of said beams between a forwardly slid elevated position and a rearwardly slid lowered position of said rack, releasable securing means for slidable rack comprising a transverse bar secured to the rear end of the rack and projecting to both sides therefrom, the end portions of said bar resting on said lower flanges to sustain the rack in its forwardly slid elevated position, and releasable stop means provided at the rear ends of said flanges and engageable with the end portions of said bar to prevent accidental rearward movement of the rack, said releasable stop means comprising bolts removably positioned in apertures formed in the rear end portions of said flanges and projecting upwardly therefrom.

2. The device as defined in claim 1 together with stop means provided at the front ends of said flanges and engageable with said rollers to prevent forward movement of the rack.

3. The device as defined in claim 1 together with a transversely extending axle secured to the front end of said rack and projecting to both sides therefrom, said rollers being mounted on the end portions of said axle.

4. The device as defined in claim 1 together with means for mounting a tire on said rack.

5. The device as defined in claim 1 together with a transversely extending axle secured to the front end of said rack and projecting to both sides therefrom, said rollers being mounted on the end portions of said axle, said rack comprising a pair of spaced parallel longitudinal straps adapted to receive a tire thereon, said straps having upturned front and rear end portions, said axle being secured to the upper ends of the front end portions and said transverse bar being secured to the upper ends of the rear end portions of said straps.

6. The device as defined in claim 5 wherein said rack also includes a cross strap extending between and secured to intermediate portions of said longitudinal straps.

* * * * *